(12) United States Patent
Carlson

(10) Patent No.: US 10,896,589 B2
(45) Date of Patent: Jan. 19, 2021

(54) SAFETY VEST FOR USE IN WORKER PROTECTION SYSTEMS

(71) Applicant: Richard C. Carlson, Village of Lake in the Hills, IL (US)

(72) Inventor: Richard C. Carlson, Village of Lake in the Hills, IL (US)

( * ) Notice: Subject to any disclaimer, the term of this patent is extended or adjusted under 35 U.S.C. 154(b) by 161 days.

(21) Appl. No.: 16/013,596

(22) Filed: Jun. 20, 2018

(65) Prior Publication Data
US 2018/0301012 A1 Oct. 18, 2018

Related U.S. Application Data

(63) Continuation-in-part of application No. 15/623,996, filed on Jun. 15, 2017, now Pat. No. 10,336,353,
(Continued)

(51) Int. Cl.
| | |
|---|---|
| *G08B 21/02* | (2006.01) |
| *H01Q 1/27* | (2006.01) |
| *A41D 1/04* | (2006.01) |
| *B61L 25/02* | (2006.01) |
| *B61L 15/00* | (2006.01) |
| *G01S 19/17* | (2010.01) |

(Continued)

(52) U.S. Cl.
CPC ............... *G08B 21/02* (2013.01); *A41D 1/04* (2013.01); *A41D 13/0002* (2013.01); *B61L 15/0027* (2013.01); *B61L 23/06* (2013.01); *B61L 25/021* (2013.01); *B61L 25/025* (2013.01); *G01S 19/17* (2013.01); *G06F 1/163* (2013.01); *G08B 7/06* (2013.01); *H01Q 1/273* (2013.01); *A41D 1/002* (2013.01); *A41D 13/01* (2013.01); *A41D 2600/20* (2013.01); *B61L 2205/04* (2013.01); *H01Q 1/32* (2013.01); *H01Q 21/28* (2013.01); *H04R 2201/023* (2013.01)

(58) Field of Classification Search
CPC .......... B61L 23/06; B61L 23/34; B61L 25/02; G08B 1/08; G08B 13/2488; G08B 21/02; G08B 21/18; G08F 1/123; G08F 1/16; G08F 1/163; G08F 1/166
See application file for complete search history.

(56) References Cited

U.S. PATENT DOCUMENTS

| | | | | |
|---|---|---|---|---|
| 2,475,578 A | * | 7/1949 | Halstead | B61L 23/00 362/88 |
| 2,762,913 A | * | 9/1956 | Jepson | B61L 23/34 246/124 |

(Continued)

OTHER PUBLICATIONS

International Search Report and Written Opinion for PCT/US2016/023754, dated Aug. 8, 2016. (10 pages).

*Primary Examiner* — Jason C Smith

(57) ABSTRACT

Systems and methods are provided for worker protection. A safety vest may be configured to support worker protection receiver function in worker protection systems. Components used in conjunction with the receiver functions may be integrated into the safety vest. The components may include one or more antennas, radio receiver (or transceiver) circuitry, integrated power supply source, indication components, and acknowledgement components. The safety vest may generate safety alerts in response to receiving signals from peer transmitter devices in the worker protection systems.

20 Claims, 7 Drawing Sheets

Related U.S. Application Data which is a continuation-in-part of application No. 15/078,427, filed on Mar. 23, 2016, now Pat. No. 10,179,595.

(60) Provisional application No. 62/605,486, filed on Aug. 15, 2017.

(51) Int. Cl.

| | |
|---|---|
| *G08B 7/06* | (2006.01) |
| *A41D 13/00* | (2006.01) |
| *B61L 23/06* | (2006.01) |
| *G06F 1/16* | (2006.01) |
| *A41D 1/00* | (2018.01) |
| *A41D 13/01* | (2006.01) |
| *H01Q 21/28* | (2006.01) |
| *H01Q 1/32* | (2006.01) |

(56) References Cited

U.S. PATENT DOCUMENTS

| | | | | |
|---|---|---|---|---|
| 5,198,800 A | * | 3/1993 | Tozawa | E02F 9/2033 212/276 |
| 5,554,982 A | * | 9/1996 | Shirkey | B61L 3/004 246/122 R |
| 5,620,155 A | * | 4/1997 | Michalek | B61L 29/24 246/121 |
| 5,652,570 A | * | 7/1997 | Lepkofker | A61B 5/1112 340/407.1 |
| 5,727,758 A | * | 3/1998 | Penza | B61L 23/06 246/124 |
| 5,924,651 A | * | 7/1999 | Penza | B61L 23/06 246/124 |
| 5,939,986 A | * | 8/1999 | Schiffbauer | B66C 15/045 299/12 |
| 6,113,037 A | * | 9/2000 | Pace | B61L 23/06 246/124 |
| 6,145,792 A | * | 11/2000 | Penza | B61L 3/125 246/122 R |
| 6,208,260 B1 | * | 3/2001 | West | B66C 15/06 340/5.1 |
| 6,232,887 B1 | * | 5/2001 | Carson | B61L 23/06 340/4.21 |
| 6,650,242 B2 | * | 11/2003 | Clerk | F16P 3/144 340/425.5 |
| 7,167,082 B2 | * | 1/2007 | Stigall | A41D 13/00 340/407.1 |
| 7,624,952 B1 | * | 12/2009 | Bartek | B61L 23/06 246/124 |
| 8,109,474 B2 | * | 2/2012 | Bartek | B61L 1/02 246/124 |
| 8,248,263 B2 | * | 8/2012 | Shervey | F16P 3/147 340/539.1 |
| 8,344,877 B2 | | 1/2013 | Sheardown et al. | |
| 8,786,428 B2 | * | 7/2014 | Sheardown | B61L 23/06 246/122 R |
| 8,952,805 B2 | * | 2/2015 | Baines | G08B 21/02 340/539.12 |
| 2010/0102954 A1 | * | 4/2010 | Radivojevic | G01S 11/06 340/539.11 |
| 2011/0006912 A1 | * | 1/2011 | Sheardown | B61L 23/06 340/901 |
| 2011/0152971 A1 | * | 6/2011 | Nghiem | A61N 1/37229 607/60 |
| 2012/0296562 A1 | * | 11/2012 | Carlson | B61L 15/0027 701/301 |
| 2013/0166114 A1 | * | 6/2013 | Baines | B61L 23/06 701/20 |
| 2014/0045547 A1 | * | 2/2014 | Singamsetty | G06F 1/1643 455/552.1 |
| 2016/0280240 A1 | * | 9/2016 | Carlson | G01S 19/17 |
| 2017/0282944 A1 | * | 10/2017 | Carlson | B61L 15/0027 |

* cited by examiner

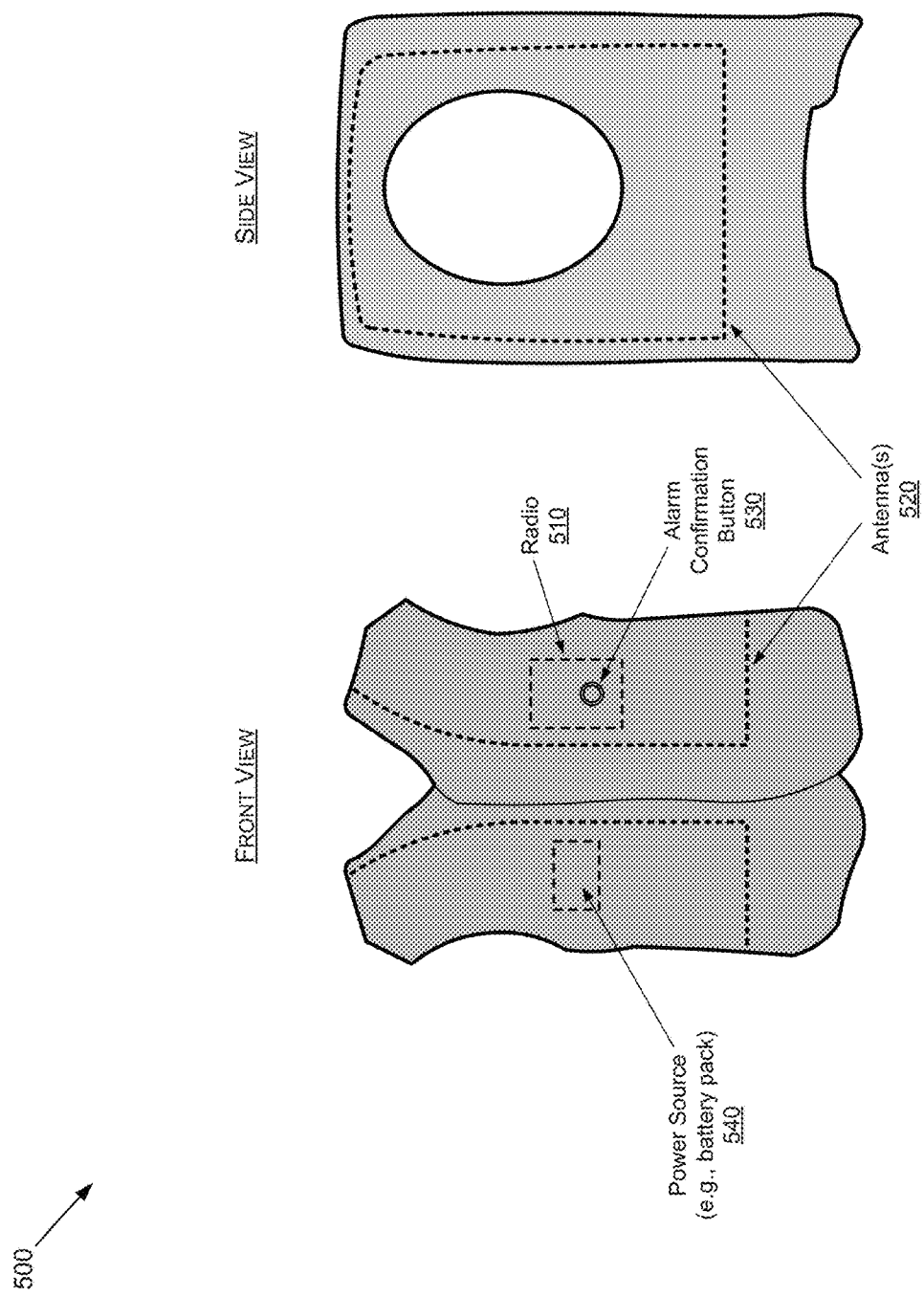

US 10,896,589 B2

SAFETY VEST FOR USE IN WORKER PROTECTION SYSTEMS

CLAIM OF PRIORITY

This patent application is a continuation-in-part of U.S. patent application Ser. No. 15/623,996, filed on Jun. 15, 2017, which in turn is a continuation-in-part of U.S. patent application Ser. No. 15/078,427, filed on Mar. 23, 2016. This patent application also makes reference to, claims priority to and claims benefit from U.S. Provisional Patent Application Ser. No. 62/605,486, filed on Aug. 15, 2017.

Each of above identified applications is hereby incorporated herein by reference in its entirety.

TECHNICAL FIELD

Aspects of the present disclosure relate to safety solutions particularly in conjunction with railway systems. More specifically, various implementations of the present disclosure relate to safety vests that can be integrated into worker protection systems.

BACKGROUND

Various issues may exist with conventional approaches for worker protection in conjunction with railway systems. In this regard, conventional systems and methods, if any existed, for worker protection in conjunction with dangers posed by work on or near tracks, can be costly, inefficient, and/or ineffective.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for safety vests that can be integrated into worker protection systems, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 5 illustrates an example safety vest, in accordance with the present disclosure.

DETAILED DESCRIPTION OF THE INVENTION

As utilized herein the terms "circuits" and "circuitry" refer to physical electronic components (e.g., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Figure 1A:
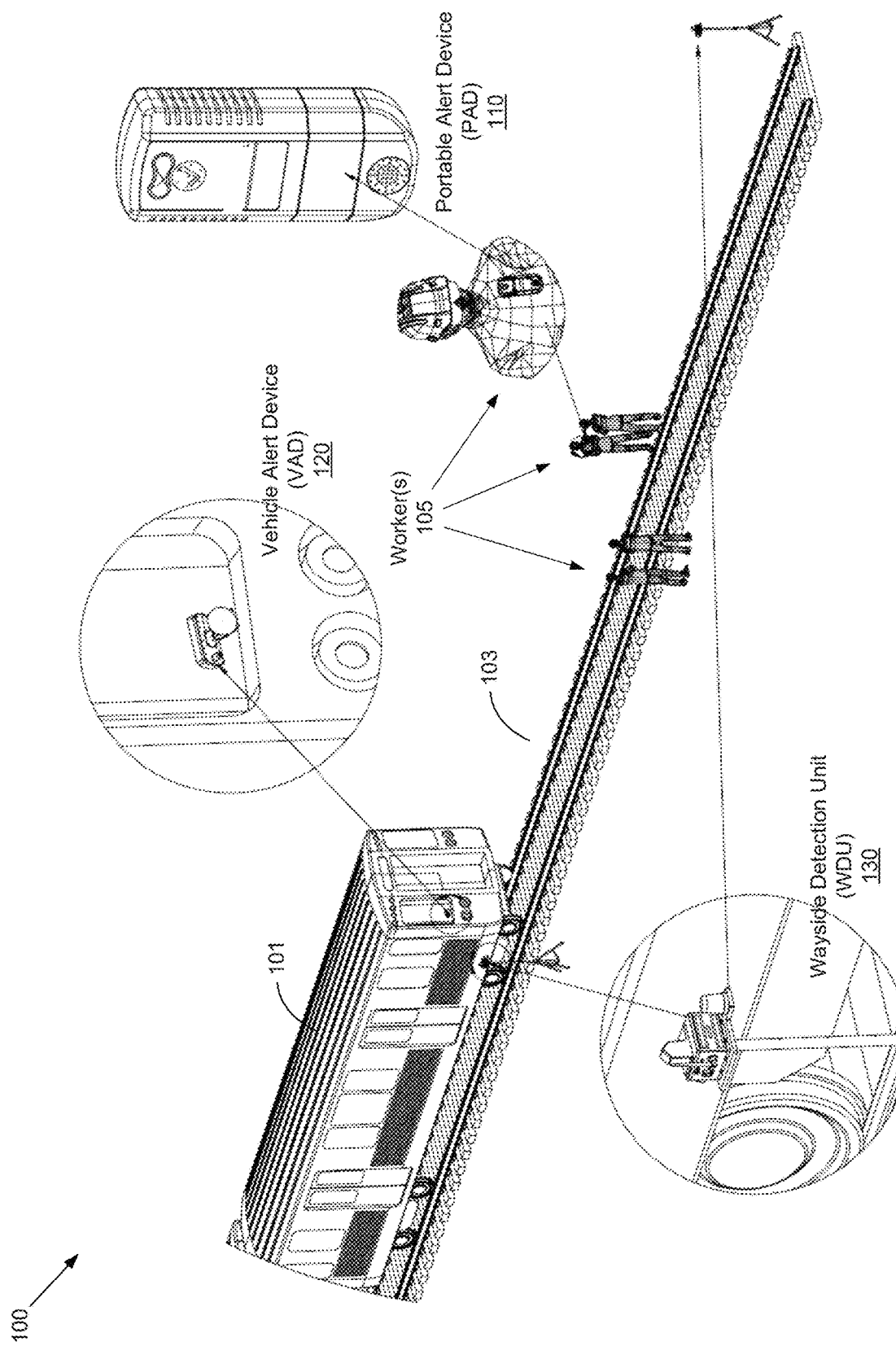
FIG. 1A illustrates an example work protection system, in accordance with the present disclosure.

FIG. 1A illustrates an example work protection system, in accordance with the present disclosure. Shown in FIG. 1A is a worker protection system 100, which may be used in providing and/or enhancing workers safety, particularly with regard to dangers posed by trains in railway work environments.

The worker protection system 100 is a proximity warning system operable to issue alerts (e.g., to railroad worker(s) 105) when a particular vehicle (e.g., a train 101) is approaching. In this regard, the worker protection system 100 comprises one or more devices or components, each comprising suitable hardware (including, e.g., circuitry), software, or any combination thereof configured for supporting worker protection related operations or functions.

For example, the worker protection system 100, as shown in FIG. 1A, comprises one or more wearable devices, referred to as portable alert devices (PADs) 110, which are worn by worker(s) 105. The PADs 110 communicate with one or more companion devices, which are configured to directly trigger (and transmit to the PADs 110) alerts, or transmit signals causing issuing of alerts by the PADs 110. The companion devices comprise vehicle-mounted companion devices, referred to as vehicle alert devices (VADs) 120, mounted on vehicles (e.g., the train 101) that may pose danger to the workers, and/or stand-alone devices that are placed in "wayside" manner—that along or near path of the approaching object (e.g., track 103 traversed by the train 101), referred to wayside detection units (WDUs) 130, which are portable devices placed by the workers 105 at the work site. The VAD 120 is configured to trigger alerts under particular conditions—e.g., when it detects it is approaching a crew equipped with the corresponding wearable devices (PADs 110). The VAD 120 may also be configured to alert the vehicle operator—that workers are in proximity, and may provide additional information in this regard (e.g., display the number of detected workers, indicate distance to workers, indicate whether workers have confirmed the alarm, etc.). Similarly, the WDU 130 is configured to trigger alerts under particular conditions, such as when it detects the approaching vehicle (the train 101). In this regard, the WDU 130 may be used when no VADs 120 are being used, or even when VADs 120 are utilized, such as to provide redundant warning capabilities with additional range.

The PAD 110 may be designed and configured as small and light device, with low profile so as not to impede normal working activities of the worker(s) 105 wearing it. For example, the PAD 110 may be worn by either a clip, arm band or belt clip. The PAD 110 is operable to issue an indication (e.g., audio, visual, tactile, etc.) to alert the worker wearing it of an approaching object (that poses a safety concern). For example, the PAD 110 may comprise audio warning component (e.g., a speaker), a visual warning component (e.g., a multi-color LED indicator), tactile indicator component (e.g., vibration), etc. Further, the PAD 110 may be operable to enable the user to provide feedback in response to issued alarm indication. For example, the PAD 110 may comprise an alert acknowledgement element, such as a confirmation button to silence alarms (i.e., a "mute" or "confirm" switch). To improve and optimize wearability of the PAD 110, its housing may be designed to include various features to support multiple mounting locations and/or approaches (e.g., clipped on the user's clothing/equipment, around the user's wrist, etc.) and/or be integrated directly into a safety vest. The PAD 110 may be configurable to provide alerts adaptively based on particular pre-set conditions—e.g., to provide at least a 15 second warning in line of sight conditions, when a train is approaching at 60 mph.

The VAD 120 may be configured either as a portable device (e.g., brought into and that may be mounted to vehicles only when needed), or as permanently mounted or integrated component (of vehicles). Implementing the VAD 120, which typically is the most costly component of the system, as a detachable device may be desirable as it allows use of small number of the VADs 120, being only moved into and used on vehicles being operated, thus reducing the deployment cost significantly. The VAD 120 may be operable to broadcast signals that are specifically configured to interfaces with the wearable devices (PADs 110) and may also interface with the wayside unit (WDU 130) to provide increased distance. Further, in some instances the VAD 120 may be operable to, when worker(s) is/are detected, provide indication to the operator(s) of the vehicle, such as by displaying and/or sounding warnings. In some instances, the VAD 120 may provide detailed information (rather than generic warning), such as indicating the quantity of workers detected, and the approximate distance to the workers.

Figure 1B:
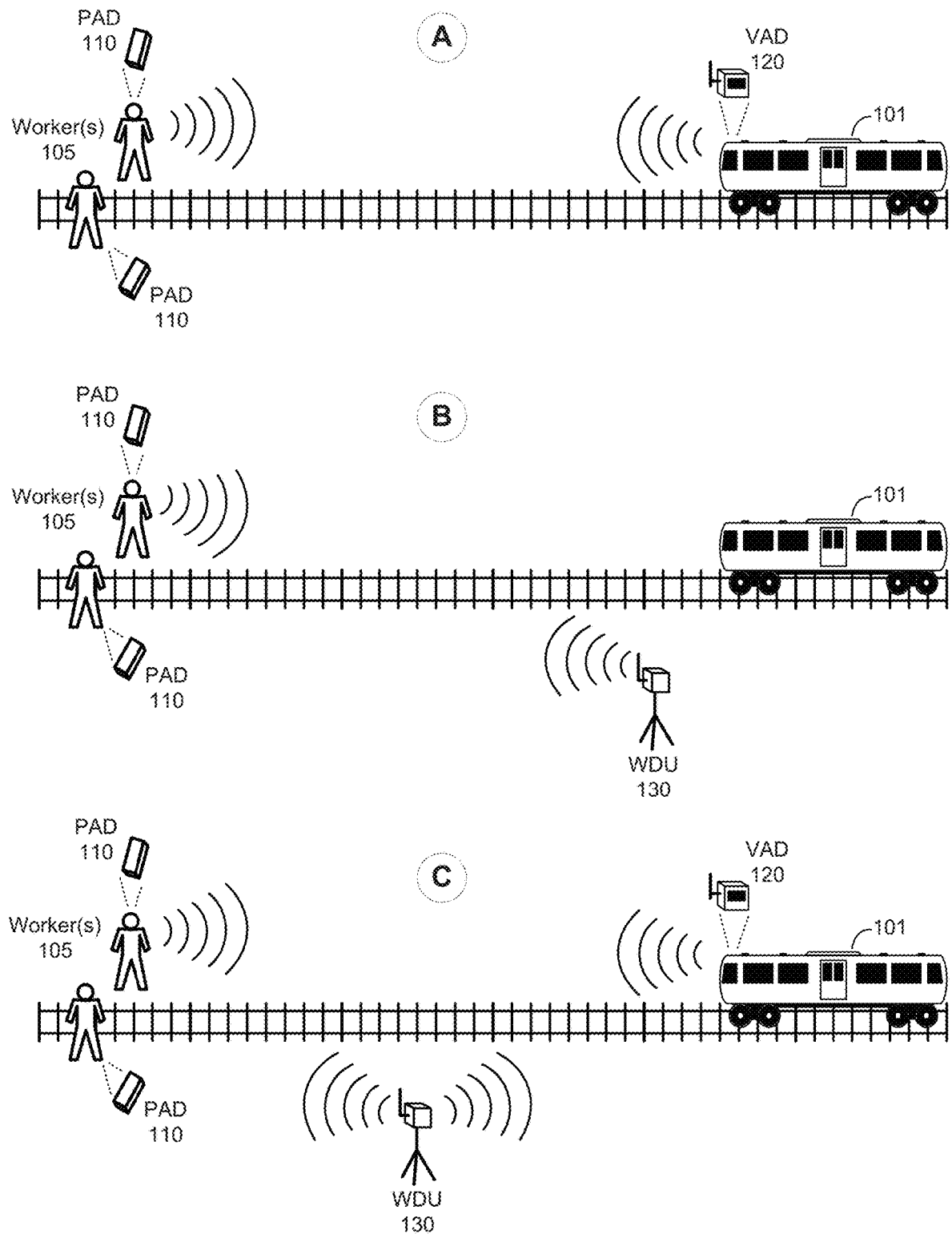
FIG. 1B illustrates example use scenarios of a work protection system, in accordance with the present disclosure.

While the VAD 120 is illustrated in FIGS. 1A and 1B as a singular physical component, incorporating all components (including antennas), the disclosure is not so limited, and in some instances VADS may be implemented to support distributed arrangements—e.g., comprising a plurality of physical units, which may be placed at different locations or positions within the vehicles. For example, VADs may comprise a first physical unit comprising the antennas (and related circuitry or other support components), and one or more other physical units housing the remaining components of the VADs. In this regard, the physical antenna unit may be configured for optimal placement (e.g., on roof of front car in train) which may be deemed optimal based on one or more placement criteria (e.g., optimal broadcast characteristics, maximum safety to operators and other individuals on train, such as passengers, etc.).

The WDU 130 is configured to operate as stand-alone device, placed on or near the path of the object(s) being detected. For example, the WDU 130 may be attached to placement component (e.g., a tripod), and is temporarily placed near the track 103. The placement of the WDU 130 may be subject to particular criteria—e.g., no closer than certain distance (for example, four feet) to the nearest rail, at or in advance of each end of a work zone. The WDU 130 broadcasts a signal when a train or vehicle passes. The WDU 130 may have dual functionality as it may interface with the VAD while also broadcasting signals to PADs. The WDU 130 may be utilized in areas where trains or other vehicles may not have vehicle mounted companion devices (e.g., VADs 120). Nonetheless, the disclosure is not so limited, and in some instances all three types of devices may work together, as described below.

In certain implementations, the WDUs 130 may be configured to operate as repeaters, for forwarding messages between the PADs 110 and the VADs 120. For example, in some instances direct, line-of-sight (LOS) communications may not be possible between the VADs and the PADs 110, such as due to the nature of the track (e.g., around curves) and/or surrounding terrain (e.g., hills, valleys, etc.), and such direct communication may not become available until it may be too late (e.g., due to speed of train, distance between train and workers, etc.). Thus, the WDUs 130 may be placed at optimal positions where they may receive signals from one element (e.g., VADs 120) and relay the signals to the other element (e.g., PADs 110). In other words, the position of the WDUs 130 may be selected such that they may have direct, LOS communication with the PADs 110 on one side, and with the approaching VADs 120 on the other side.

In certain implementations, worker protection systems in accordance with the present disclosure, such as the worker protection system 100, may incorporate various solutions for providing worker alerts (particularly, e.g., for railway work environments) in enhanced and adaptive manner. For example, the worker protection system 100 may be configured to trigger alerts based on speed, at least in part, rather than simply based on distance between workers and approaching trains. In this regard, the worker protection system 100 may be configured to utilize the approach speed to appropriately time to the alert so that the alerts are not triggered too late, but also are not triggered too early causing the workers 105 to start ignoring and suppressing alerts (e.g., on very slow moving or stationary vehicles), until the vehicle is actually a potential threat. Thus, the distance at which the alerts are triggered may be based on the speed of the vehicles. For example, for trains approaching at speeds under 4 mph, no alerts are triggered until the train is within 100 feet, whereas for a train approaching at 30 mph the alerts are triggered when the train is within 1000 feet. The worker protection system 100 may also be configured to trigger alerts based on distance in adaptive manner. For example, the worker protection system 100 may be configured to trigger alerts based on changes in the distance between workers and approaching trains—e.g., with the alerts being triggered only where the distance is decreasing (and/or particularly falls below particular value), and not triggered when the distance remains constant or is increasing. In other words, the triggering (or not) of alerts may be configured to be based on the directionality—that is direction of movement of the train in relation to the workers. The conditions at which the alerts are triggered (e.g., speed, distances, or combinations thereof) may be configurable.

Various aspects of the alert related operations (triggering criteria) and/or associated functions (e.g., logging) may be location-dependent. As such, worker protection systems in accordance with the present disclose (e.g., the worker protection system 100) may support use of positioning solutions (e.g., Global Navigation Satellite System (GNSS) technologies, such as GPS, GLONASS, Galileo, etc.), to enable obtaining location/positioning information that may be used in alert related operations or functions. This may be done by incorporating into the various devices (e.g., the PADs 110, the VADs 120, and the WDUs 130) dedicated GNSS resources (e.g., receivers, antennas, etc.) and/or by configuring them to use existing GNSS resources where possible (e.g., use of existing positioning application in the train 101 by the VAD 120).

The alerts may be triggered only when a preset (programmed) alert trigger threshold is satisfied (e.g., vehicle's speed exceeding particular limit, distance to workers falling below particular value, etc.). In certain implementation, multiple threshold types may be used. For example, in one example implementation, three alert threshold types may be used: time-to-arrival (TTA), distance-from-train (DFT), and low-speed close proximity distance alert (CPD). These different types of thresholds may be applicable at different conditions. For example, at low speeds, below a configurable speed threshold, the workers will not get TTA or DFT alerts; rather, the alert triggering is held off until the train/vehicle comes within a programmed short distance. This may avoid triggering DFT alert prematurely (time-wise), when it still might be a long time (e.g., minutes) until the train arrives due to its low speed.

In certain implementations, worker protection systems in accordance with the present disclosure, such as the worker protection system 100, may support location-specific rule customization. For example, an operator (e.g., a transit agency) may desire modified alerting rules at particular areas/locations (e.g., due to unique geography, or greater difficulty in seeking safe shelter, etc.). Thus, alert devices that are intended for use in such areas/locations may be reconfigured dynamically. This may be done by use of (re-)customization stations at entry points to those areas/locations, to reconfigure the alert devices dynamically. This may be done using near field communication rule modification. The alert units may be placed in proximity to the customization stations briefly, and the rules are then updated. Further, indications (e.g., visual, audible, etc.) of successful (or failed) rule changes may be provided. In some instances, the special/customized rules may be configured to expire, such as after a certain period of time, after next power down or charging cycle, etc.

In certain implementations, worker protection systems in accordance with the present disclosure, such as the worker protection system 100, may be configured to provide alerts for both the vehicle operator as well as all workers. The worker protection system 100 may be configurable based on user preferences and/or parameters. For example, the worker protection system 100 may be configured to operate (trigger alerts) within operator-configurable combinations of distances, speeds, location, etc. Further, the PADs 110 may be customized to operate according to individual organizations' rules and regulations.

In certain implementations, worker protection systems in accordance with the present disclosure, such as the worker protection system 100, may be operable to allow assignment and/or unique identification of vehicle-mounted units (i.e., VADs 120), such that the wearable units (PADs 110), as well as the wayside units (WDUs 130) would only respond to alerts corresponding to particular tracks. In other words, each VAD 120 would be identified uniquely, and assigned to a particular track, to enable only PADs 110 and/or WDUs 130 used by workers on that particular track to respond to alerts triggered by that VAD 120, while ignoring other VADs 120 (thus avoiding false alerts).

In certain implementations, worker protection systems in accordance with the present disclosure, such as the worker protection system 100, may provide information relating to the objects triggering (or that may trigger) alerts, particularly in audible manner. For example, the worker protection system 100 (or particularly the PADs 110) may be configured to provide voice outputs relying information relating to the approaching trains (e.g., train identifier or other identification information, track identifier or other identification information for the track being used, direction of train movement (north, east, west, etc.), and the like). The information may be provided by the VADs 120, being embedded into alerts signals and/or signals triggering alerts.

In certain implementations, worker protection systems in accordance with the present disclosure, such as the worker protection system 100, may be configured to utilize and/or support customized alerts. For example, each of the system users (e.g., the workers 105) may customize the alerts that would be issued in case of hazards (e.g., approaching trains). The customization may comprise specify particular characteristics, such as specifying particular tone, music, etc. for use when alerts are triggered. The customization may also comprise defining and/or selecting particular types of alerts. For example, supervisors may configured and/or specify alerts that are triggered when one or more of the workers are not detected within the work zone. Such alert may be different (e.g., utilize different tone) than the alerts triggered based on approaching trains.

In certain implementations, worker protection systems in accordance with the present disclosure, such as the worker protection system 100, may be configured to provide optimized power performance (e.g., power supply, power consumption, etc.). In this regard, the power supply may be adaptively selected and/or configured for each of different devices in the worker protection system 100, based on the type and/or working conditions for the device. For example, the PAD 110 may be powered using integrated power supply (e.g., batteries or similar power sources). In this regard, rechargeable batteries may be used, allowing the recharging of the device when not in use (e.g., being inserted or docked into charging stations at the end of each day to be charged for work the following day. The VAD 120 may be powered by the vehicle to which it is mounted or integrated. The WDU 130 may be powered using integrated power supply (e.g., batteries or similar power sources), which may be rechargeable.

Further, certain solutions may be incorporated and/or used to enhance overall power consumption. For example, the PAD 110 may be configured to support one or more power-saving modes (e.g., modes with the PAD 110, or at least some of the components thereof, transitioning to low functionality states, or completely shutting down). The PAD 110 may be operable to facilitate transitioning back to full functionality (or powering up) when necessary. For example, the PAD 110 may be configured to automatically shut down when it is not being used (e.g., when placed in a charger or docking bay for recharging). Further, the PAD 110 may be operable to dynamically determine when to transition to (or from) power saving modes. For example, the PAD 110 may comprise a component (e.g., accelerometer) for determining when the device is idle for an extended period of time, and respond to that by entering power saving mode (e.g., shut down, or operate with less frequent polling). Such accelerometer detects the lack of motion for a period of time to enter the power-saving mode; then trigger return to normal operating mode when movement is detected.

In certain implementations, worker protection systems in accordance with the present disclosure, such as the worker protection system 100, may be configured to provide logging and data recording. The logging and data recording may be used, for example, for training, for location tracking, and/or for even recreating (e.g., during accident investigation). For example, the PAD 110 may comprise circuitry for data recording and/or logging—e.g., to compile downloadable log files, which may be accessible (remotely, such as via any available communication means, or by direct connection to the PAD 110, such as when the device is docked for recharging). Such log files are then available to allow examination of alerts as well as related events and/or activities (e.g., users' responses, such as alert silencing actions). The VADs 120 and/or the WDUs 130 may similarly be configured to support logging of worker protection/alert related information, such as by also compiling downloadable log files that are available when needed. The log files may contain data recording triggered alerts and related information (e.g., alerts' times and/or location, distances to workers and traveling speed within work zone workers' acknowledgment or response actions, etc.), as well as other information relating to, e.g., faults, mechanical shock over thresholds, etc. Further, logs may include GPS positioning information (e.g., coordinate of locations of alerts), time of events, compass bearing, received signal strength, and antenna used, when available.

In certain implementations, logging and data recording functions provided by worker protection systems in accordance with the present disclosure, such as the worker protection system 100, may be configured to support additional information and/or for additional services. For example, the logging functions, particularly those provided in the PADs 110 worn by the workers 105, may be configured to maintain regular records of the workers 105 (e.g., information relating to workers' whereabouts and/or movement), particularly when the workers 105 are or should be at the work site. This information may be used, such as to verify the presence of the workers at the work sites and/or to analyze actions of the workers with respect to approaching trains.

In certain implementations, worker protection systems in accordance with the present disclosure, such as the worker protection system 100, may be incorporate various communication techniques for optimizing performance, with respect to the broadcast, reception, and processing of signals used in triggering alerts. For example, the PAD 110 may incorporate diversity antennas of identical or differing polarity, to improve signal reception reliability. Use of such diversity antennas (with corresponding signal processing functions) allows for improved performance in certain conditions, such as when the worker 105 is not in the optimal position of antenna orientation.

In certain implementations, worker protection systems in accordance with the present disclosure, such as the worker protection system 100, may be configured to provide backward compatibility with existing protection solutions and/or protocols. Further, it may be particularly designed and implemented such that it may be integrated into future communications based train control systems.

In certain implementations, multiple devices in worker protection systems in accordance with the present disclosure, such as the worker protection system 100, may be configured to operate collaboratively, to ensure that alerts are received by all workers. For example, the PADs 110 and/or the WDUs 130 may be configured to relay alerts (e.g., of approaching trains) to other devices nearby, thus improving the field strength of warning signals, by increasing the probability that all nearby PADs 110 receive the alert (even devices that may have not been able to receive the signals/alerts directly).

In certain implementations, multiple devices in worker protection systems in accordance with the present disclosure, such as the worker protection system 100, configured for operating collaboratively may be operable to arrange the communications between them to ensure optimal performance. For example, the PAD 110 closest to the approaching train and/or is in optimal position for detection and/or communication with the approach train may initiate a chain of communication in cascading manner, to notify the other PADs 110 and/or relay alerts or alert triggering signals to those PADs. Further, the PADs 110 may optimize the links among them, such as by use of ranging techniques and the like, to determine optimal communication configurations (e.g., type, parameters, etc.). Determining the device closest (or in optimal position) for detecting and communicating with the approaching train may be done in adaptive manner. For example, the PADs 110 may swarm to determine which device is the closest or in optimal position for that task.

In certain implementations, worker protection systems in accordance with the present disclosure, such as the worker protection system 100, may be configured to forward alerts and/or information relating to alerts to other recipients (beside the workers 105). For example, the WDUs 130 may be configured to issue warnings to pre-assigned recipients (e.g., supervisors) if the WDUs 130 fail to detect and/or to receive acknowledgements from PADs 110 (e.g., from at least one PAD 110 associated with particular work site) when detecting an approaching train and/or receiving alerts (or alert triggering signals) from the approaching train.

In certain implementations, worker protection systems in accordance with the present disclosure, such as the worker protection system 100, may be configured to generate alarms, relating to status of particular elements and/or users of the systems, which may be configured to transmittal to other recipients (beside the workers 105). For example, the WDUs 130 may be configured to generate and send alarms to particular recipients (e.g., supervisors), who may be pre-defined or specified dynamically (e.g., by input into the WDUs 130 when deployed) in particular situations, such as when/if the WDUs 130 fail to detect and/or to receive acknowledgements from PADs 110 (e.g., from at least one PAD 110 associated with particular work site). Such alarm function may be performed independent of the alert related operations—that is, it may be done even where no trains are approaching the work zone. For example, the WDUs 130 may be associated (e.g., dynamically, when being deployed, at the work zone) with a list of PADs 110. The WDUs 130 may then monitor the PADs 110, such as by detecting them at periodic intervals. When one of the PADs 110 is not detected, alarms may be generated and communicated to particular designated recipient(s), who may be local (at the work zone) or remote (e.g., at a central facility). The alarm recipient(s) may be pre-assigned and/or may be assigned dynamically (e.g., input into the WDUs 130, when being deployed).

In certain implementations, particular elements of worker protection systems in accordance with the present disclosure, such as the worker protection system 100, may be configured to provide additional functions and/or services, particularly in support of alert operations and/or overall safety. For example, the WDUs 130 may be configured to function as beacons broadcasting information unrelated to particular threats. The WDUs 130 may broadcast, for example, alerts to indicate presence of active work zones and/or to warn others (e.g., non-worker in the vicinity) not to approach the work zone. In other words, such alerts may not be related to and/or triggered by particular trains (and/or when trains approach the work zone), and may serve as indication of the hazards posed by the work zone to non-workers who may approach that zone. The alerts may be configured as unique alerts—e.g., using unique identifiers associated with the work zones.

The various devices (PADs, VADs, WDUs) used in the worker protection systems may be designed and/or implemented to meet certain operational requirements (relating to, e.g., shock/vibration, temperature/humidity, salt conditions, icing, hose down, electrostatic discharge (ESD), electromagnetic compatibility (EMC), electromagnetic interference (EMI), electromagnetic compatibility, etc.) in accordance with particular standards that may be pertinent to the related industries (MIL-STD-810, AREMA 11.5.1, IEC 61000-4, SAE J1113, CISPR 22, FCC Title 47, Association of American Railroads (AAR) All Applicable AAR S-9401, etc.).

Accordingly, worker protection systems in accordance with the present disclosure, such as the worker protection system 100, with many of the components being portable and/or configurable, offer portability and ease of configuration, allowing them to be set up in any work environment seamlessly.

FIG. 1B illustrates example use scenarios of a work protection system (e.g., the work protection system 100 of FIG. 1A), in accordance with the present disclosure. In this regard, the different use scenarios may be based on which of and how the different devices in the work protection system 100—that is the PADs 110, the VADs 120, and the WDUs 130—interact during operation of the system, to provide the intended protection.

For example, in a first use scenario (denoted as 'A' in FIG. 1B), only worker wearable devices (PADs 110) and vehicle-mounted devices (VADs 120) are used—i.e., no wayside devices (WDUs 130) are used. In other words, as shown in FIG. 1B, the train 101 is equipped with a VAD 120, which broadcasts signals to interface with the PADs 120 worn by worker(s) 105, to detect if the train 101 is in proximity where an alarm is activated. In this regard, the PADs 120 will issue an alert (e.g., audible alarm) once they are detected by any train-based VAD 120, such as within a specified distance. On the vehicle side, the VAD 120 may further provide information to the operator when the PADs 120 are detected. For example, a user interface may indicate such information as how many PADs 120 (and thus worker(s) 105) are present within the specified distance. Further, the workers and/or operators may respond to issued alarms—e.g., silencing them, such as by acknowledging them on the wearable devices and/or on the user interface of the vehicle mounted devices.

In a second use scenario (denoted as 'B' in FIG. 1B), no vehicle-mounted devices (VADs 120) are used; rather, the worker wearable devices (PADs 110) are only in communication with the wayside devices (WDUs 130). In this regard, the wayside devices monitor for and detect approaching vehicles (e.g., the train 101), broadcast alarms (or signals triggering alarms) when a vehicle is in proximity (e.g., determined when at particular distance from the wayside device and/or moving at particular speed). For example, when the train 101 is detected by the WDU 130 (e.g., when it passes it, or moves within certain distance from it, at particular speed), it sends a proximity warning to all local PADs 110. Once the alarms is triggered at the wearable devices, they may continue until acknowledged by the workers—e.g., audible alarms continue until silenced, such as by hitting a "confirm" button.

In a third use scenario (denoted as 'C' in FIG. 1B), all three types of devices—that is worker wearable devices (PADs 110), vehicle-mounted devices (VADs 120) and wayside devices (WDUs 130)—are used, and may communicate with one another to provide the desired protection. In such scenarios, a worker wearable device may be activated and/or triggered by vehicle-mounted devices as well as wayside devices, for redundancy (thus enhanced protection). For example, the train 101 may be equipped with the VAD 120, which may communicate directly with the WDU 120 as the train 101 approaches it, such as when the train 101 is at a specified distance. In response, the WDU 130 may send proximity warnings (trigger alarms) to all local PADs 110. Under certain conditions (e.g., at particular distance and/or speed), the VAD 120 may communicate directly with the local PADs 110, to trigger alarm (which may be configured differently, such as for heightened risk).

Various techniques and/or approaches may be used for the detection and/or triggering of alerts. For example, in one particular implementation, the PADs 110 may be configured to periodically broadcast pings (e.g., chirp spread spectrum (CSS) based pings, in the 2.4 GHz frequency band). When the pings are received by the VAD 120, the system may initiate range measurements, whereby both the VAD and PAD determine the distance to the companion device. The result of the distance measurement may cause the PADs 110 to trigger and issue alerts to the workers 105. The pings and/or the alerts (or alert triggering signals) may be forwarded by the WDUs 130. The distance measurement result may also cause the VAD 120 to trigger and issue an alert to the vehicle 101 operator.

Figure 2A:
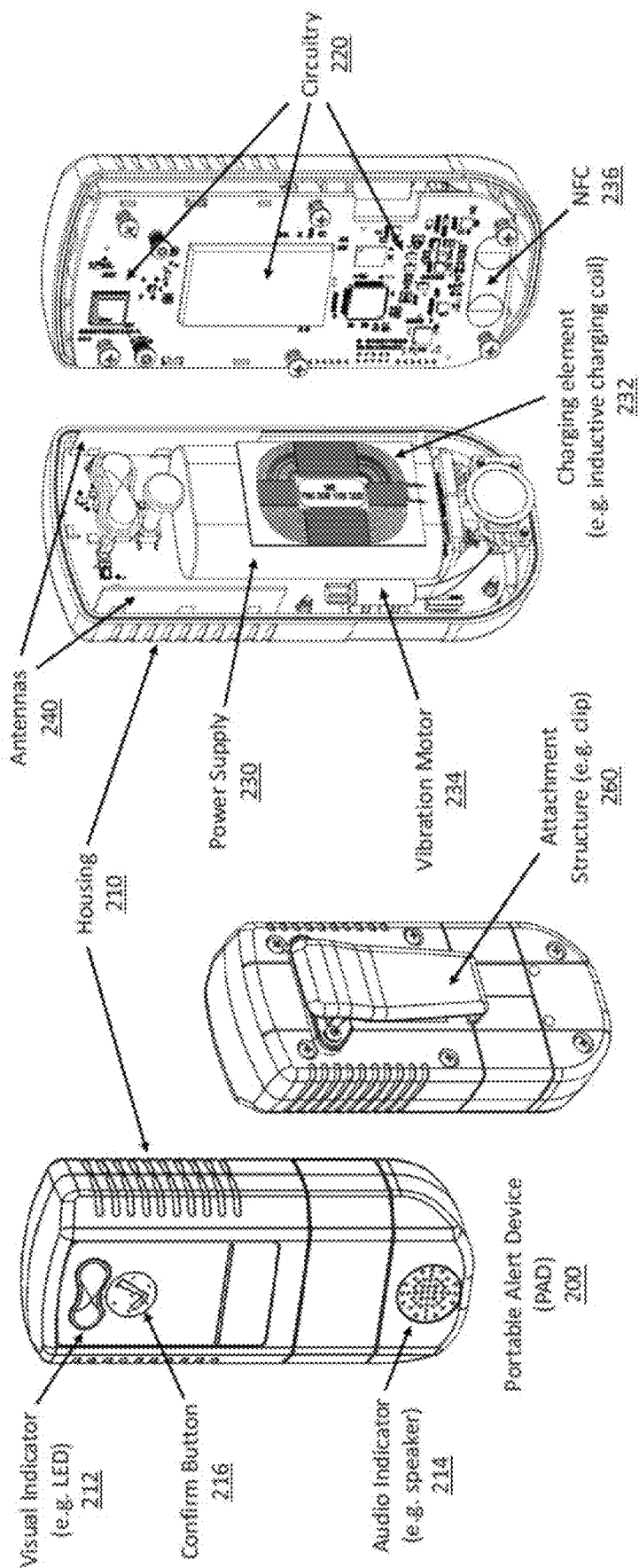
FIG. 2A illustrates an example portable alert device (PAD), in accordance with the present disclosure.

FIG. 2A illustrates an example portable alert device (PAD), in accordance with the present disclosure. Shown in FIG. 2A is a portable alert device (PAD) 200.

The PAD 200 may comprise suitable one or more of hardware (including circuitry and/or other hardware components), software, and combination thereof for implementing various aspects of the present disclosure, particularly with respect to the support of portable wearable functionality in worker protection solutions, as described above. The PAD 200 may be a particular example implementation of the PAD 110, as described with respect to FIGS. 1A and 1B. In this regard, as noted above PADs may be configured as portable devices that are wearable by users (e.g., workers) to provide alerts regarding approaching vehicles that may pose safety threats to workers at particular locations. The PAD 200 is operable to perform such functions, in support of work protection systems in accordance with the present disclosure, as receiving alerts (or triggering alerts in response to broadcast warning signals) and providing alert indications to the user (the worker wearing the device), as well as additional alert related functions, such logging alert related data, etc.

In the example implementation illustrated in FIG. 2A, the PAD 200 may comprise a housing 210 for enclosing various components of the PAD 200. The housing 210 may be constructed to be suitable for the intended operations (and environment and/or conditions thereof) of the PAD 200 (e.g., strong enough to withstand harsh work environment but light enough as to not encumber the worker or hinder his/her activities), and to withstand environmental conditions associated with outside/external use (e.g., rain, extreme cold/heat), etc.).

The PAD 200 may comprise (or may be integrated with) an attachment structure 260, for facilitating the wearability of the PAD 200, by enabling the PAD 200 to be attached to the worker and/or to item used by the worker (e.g., clothing, equipment, etc.). In this regard, the PAD 200 may support various types of attachment structures, to allow worker to select preferable way for apply the device. For example, as shown in FIG. 2A, the PAD 200 may comprise or be coupled to a clip structure 260, so that the PAD 200 may be clipped onto the worker's clothing, belt, etc. In another implementation (not shown), the PAD 200 may comprise or be coupled to a strap structure, so that the PAD 200 may be attached around the worker's wrist.

The PAD 200 has one or more antennas 240, which may be integrated or enclosed within the housing 210, configured for transmitting and/or receiving signals (e.g., broadcast alert related signals). As noted above, PADs may support use of various optimization techniques, including use of diversity, and as such the antennas 240 may comprise diversity antennas of identical or differing polarity.

The PAD 200 may have an integrated/internal power supply 230, for powering the various components of the PAD 200. In this regard, the power supply 230 may be rechargeable. For example, charging stations (an example of which is described with respect to FIG. 2B) may be used. The recharging of the power supply 230 may be done in various ways, including by use of charging stations (an example of which is described with respect to FIG. 2B) for example. In this regard, the PAD 200 may be connected (e.g., coupled, inserted, docked, etc.) to the charging station when it is not being used (e.g., at the end of each day) to be charged.

The PAD 200 may comprise suitable circuitry 220 for performing various operations in support of its functions. For example, the circuitry 220 may be operable to store data (including code); run and/or execute various applications and/or functions (alert related); handle transmission and/or reception of signals (and processing transmitted and/or received signals); provide power management; manage logging operations in the PAD 200; and handle input/output functions (e.g., supporting different forms of alert indications, including visual, audio, and/or tactile, and handling user input, such as acknowledges of alerts).

As shown in FIG. 2A, the PAD 200 comprises a visual indicator (e.g., LED) 212 and an audio indicator (e.g., speaker) 214, which are integrated into the housing 210, and are configured to provide visual and/or audio indication in response to triggering of alerts. Also, within the housing 210, the PAD 200 comprises a vibration motor 234, which may be configured to cause vibrations in response to triggering of alerts. The PAD 200 may be configured to use one or more of available indications means—e.g., one or more of visual, audio, and tactile indications. This may be done based on pre-set criteria, user selected preferences, dynamic configuration of the device, etc.

Further, as shown in FIG. 2A, the PAD 200 comprises a confirmation button 216, which is configured to receive indication of user acknowledgment (e.g., by pressing the confirmation button 216), when alert indication(s) is/are outputted. In some instances, the PAD 200 may, in response to receiving user confirmations, generate and transmit acknowledge messages, to other alert devices (e.g., PADs, WDUs, and/or VADs broadcasting and/or forwarding signals triggering alerts that were confirmed).

In some example implementations, PADs in accordance with the present disclosure (such as, e.g., the PAD 200) may not have any openings for connectors or the like (for enhanced rigidity and/or protection against the elements). The functions of the PADs may be configured to account for and/or accommodate such design.

For example, only wireless communications are used such as using near field communications (NFC), for communication of data, and charging of the power supply fs performed indirectly, such as using magnetic induction. Thus, as shown in FIG. 2A, the PAD 200 comprises a NFC component 236 for supporting NFC transmission and/or reception. Further, the PAD 200 comprises a charging element 232, for enabling (re)charging the power supply 230 in connectless manner—e.g., without requiring plugging a power cord or other wired cabling. The charging element 232 may comprise an inductive charging coil, for example. The PAD may also include an environmentally sealed button to allow the operator to perform alarm confirmation and silencing.

In certain implementations, PADs may be configured to utilize their NFC resources for enabling certain operations (e.g., input of information, etc.) in convenient and quick manner. For example, the NFC component 236 may be configured to operate as RFID (Radio-frequency identification) reader, such as to allow assigning information (e.g., assigning particular track number associate with particular work zone), to (de-)activate the PAD 200, etc.

Figure 2B:
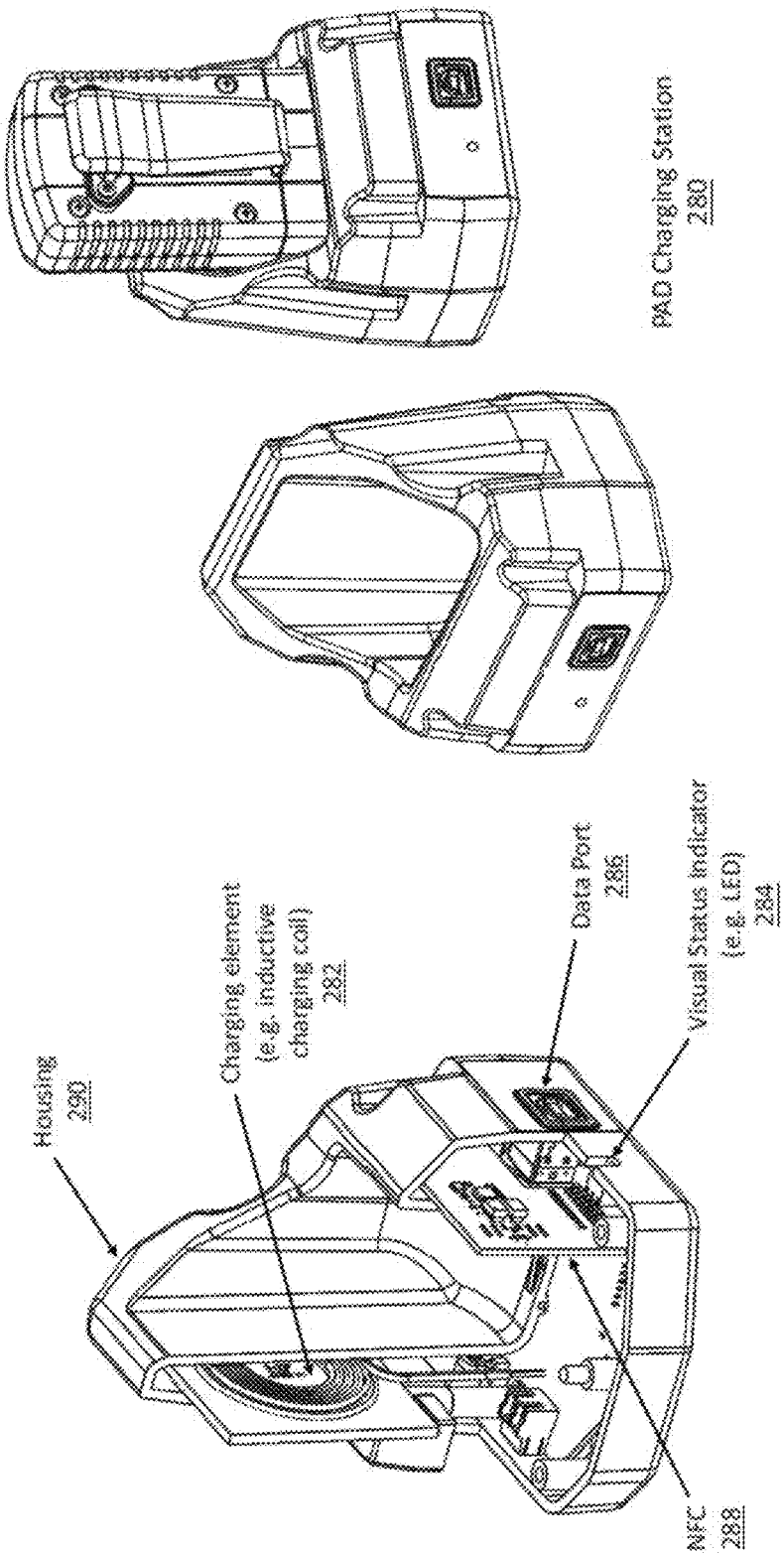
FIG. 2B illustrates an example charging station for use in conjunction with portable alert devices (PADs), in accordance with the present disclosure.

FIG. 2B illustrates an example charging station for use in conjunction with portable alert devices (PADs), in accordance with the present disclosure. Shown in FIG. 2B is a PAD charging station 280, which may be used in conjunction with portable alert devices (PADs), such as the PAD 200 of FIG. 2A.

The PAD charging station 280 may comprise suitable one or more of hardware (including circuitry and/or other hardware components), software, and combination thereof for implementing various aspects of the present disclosure, particularly with respect to the support of portable alert devices (PADs). In this regard, the main function of the PAD charging station 280 may be (re)charging PADs (e.g., the PAD 200 of FIG. 2A). The PAD charging station 280 may support additional functions, however. For example, the PAD charging station 280 may support and/or facilitate exchange of data with the PADs, such as to enable extraction of data from the PADs (e.g., log files) and/or input of data into the PAD (e.g., (re)configuration data), etc.

As shown in the example implementation illustrated in FIG. 2B, the PAD charging station 280 may comprise a housing 290 for enclosing various components of the PAD 200. The housing 290 may be constructed to be suitable for intended uses and/or functions of the PAD charging station 280. For example, the housing 290 may be configured such that it defines a space into which the supported PADs (e.g., the PAD 200 of FIG. 2A) may be inserted and/or docked.

The PAD charging station 280 may comprise various components for supporting and/or enabling charging power supplies of supported PADs. In this regard, the PAD charging station 280 (and charging related components thereof) may be configured to facilitate the charging in the manner required by the supported PADs. For example, in the example implementation illustrated in FIG. 2B, the PAD charging station 280 comprises a charging element 282 integrated within the housing 290, and configured for supporting recharging in connectless manner. The charging element 282 may comprise an indicative charging coil, for example, for enabling (re)charging by induction.

The PAD charging station 280 may comprise a data port 286 for extracting data from and/or inputting data into the PADs, while docked into the PAD charging station 280.

Further, the PAD charging station 280 may comprise suitable communication circuitry for facilitating the actual exchange of data with the docked PADs. For example, the data exchanges may be done via near field communication (NFC) connections, and as such the PAD charging station 280 may comprise an NFC component 288 for supporting such communications.

In some instances, the PAD charging station 280 may comprise input and/or output (I/O) component for use in conjunction with operations of the PAD charging station 280. For example, the PAD charging station 280 may comprise a visual status indictor (e.g., LED) 284, integrated within the housing 290, to provide useful feedback (e.g., indication when charging, data extraction, data input, etc. is complete).

Figure 3:
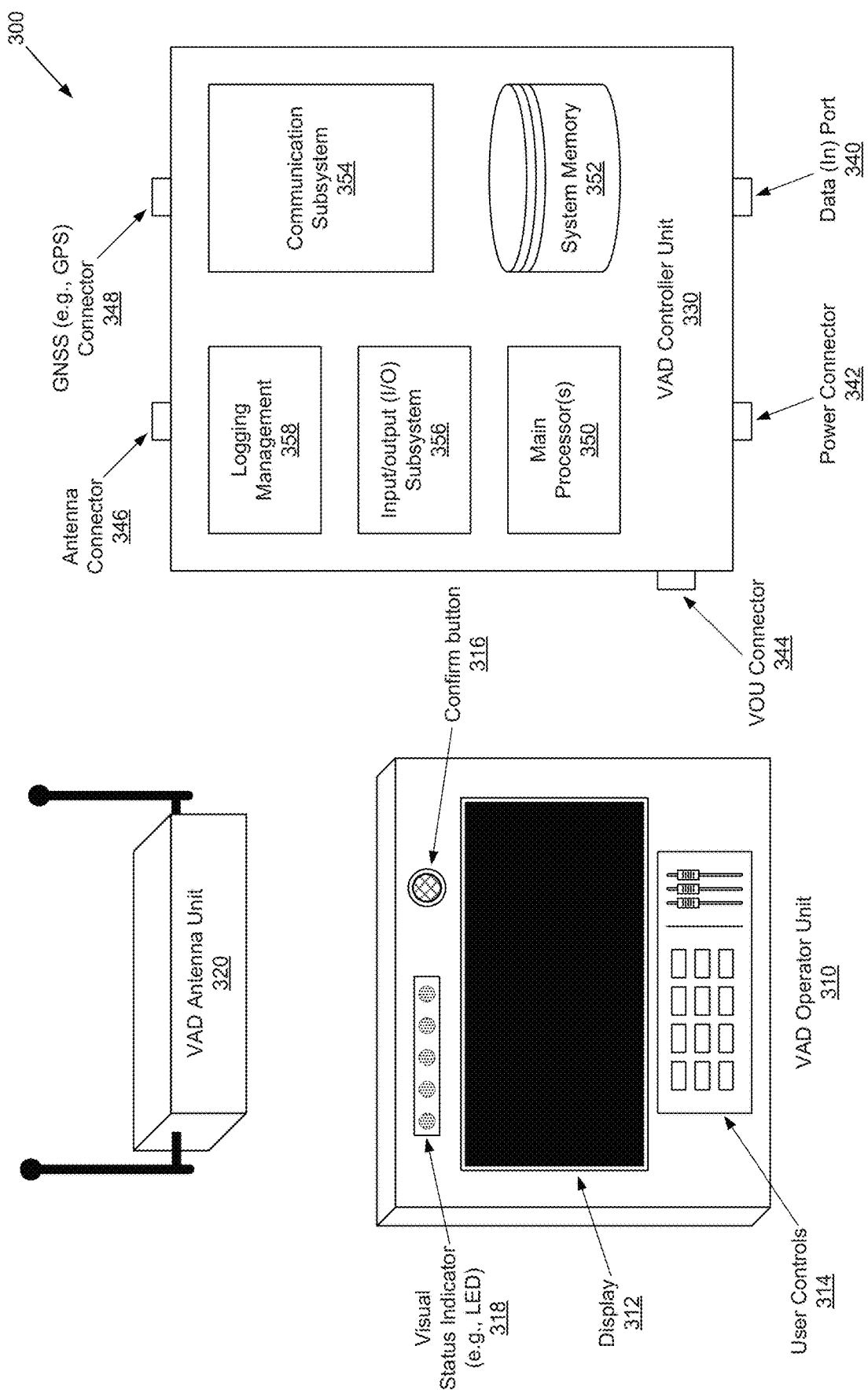
FIG. 3 illustrates an example vehicle alert device (VAD), in accordance with the present disclosure.

FIG. 3 illustrates an example Vehicle Alert Device (VAD), in accordance with the present disclosure. Shown in FIG. 3 is a vehicle alert device (VAD) 300.

The VAD 300 may comprise suitable one or more of hardware (including circuitry and/or other hardware components), software, and combination thereof for implementing various aspects of the present disclosure, particularly with respect to the vehicle-mounted functionality in support of worker protection. The VAD 300 may be a particular example implementation of the VAD 120, as described with respect to FIGS. 1A and 1B. In this regard, as noted above VADs may be configured as portable (moveable) devices or as permanent components integrated into vehicles. The VAD 300 is operable to perform such functions, in support of work protection systems in accordance with the present disclosure, as broadcasting signals configured for interfacing with wearable devices (e.g., PADs 100), as well as additional alert related functions, such alert-related interactions with vehicle operators (e.g., to indicate when worker(s) is/are detected, for example by sounding a warning and/or providing a visual indicators, and/or displaying related information, such as the quantity of workers detected, and the approximate distance to the workers), logging alert related data, etc.

While VADs may be implemented as singular devices (that is within a single housing incorporating and/or attaching all components of the VAD), in some implementations, such as the example implementation illustrated in FIG. 3, VADs may be implemented in a distributed manner—e.g., comprising a plurality of physical units, each of which may be placed at particular location and/or position, selected for optimal performance with respect to functions and/or operations provided by that unit. For example, as shown in FIG. 3, the VAD 300 may comprise a VAD operator unit 310, a VAD antenna unit 320, and a VAD (main) controller unit 330.

The VAD operator unit 310 may comprise components for supporting interactions with the vehicle operator—e.g., to received user input and/or provide user feedback relating to operation of the VAD 300 and/or to alerts. For example, the VAD operator unit 310 may comprises input/output (I/O) components (and related circuitry and/or support hardware), such as a display 312 and user controls 314, to enable user interactions. Further, the VAD operator unit 310 may comprise and/or be operable to utilize I/O components configured for providing indications relating to triggering of alerts and/or receiving feedback (e.g., confirmation) relating to such indications. For example, the VAD operator unit 310 may comprise a speaker (not shown), configured for providing audible indications of triggered alerts, a visual status indicator (e.g., LED) 318, configured for providing visual indication of triggered alerts, and a configuration button 316, configured to receive indication of user acknowledgment (e.g., by pressing the confirmation button 316), when alert indication(s) is/are outputted. The user controls 314 may comprise various types of user input elements, such as buttons, dials, etc. for allowing vehicle operator(s) or device users to provide input, such as to configure the VAD 300 and/or its operations, to respond to alerts (when triggered), etc. The user controls 314 may be implemented in the form of a touch screen (e.g., as part of the display 312), or be implemented with an alpha-numeric display. The display 312 (or any type of user interface) may be used to provide the vehicle operator with various information, such as alert related data (e.g., indicate the quantity of workers detected, and the approximate distance to the workers, calculated time till reaching the workers, etc.).

In some instances, rather than incorporating dedicated I/O components, the VAD 300 (or the VAD operator unit 310) may be operable to connect to and use existing I/O components (e.g., displays, speakers, etc.) in the vehicle, thus obviating the need to (and cost of) incorporating such dedicated components. For example, the VAD operator unit 310 may be operable to utilize existing audio systems to provide audible indication of triggered alerts.

The VAD antenna unit 320 may comprise one or more antennas 340 (and related circuitry and/or support hardware), configured for use in transmitting and/or receiving signals (e.g., broadcast alert related signals, receiving signal indicating triggering of alerts and/or confirmation of such alerts by workers, etc.). In some implementations, however, the VAD antenna unit 320 may not incorporate dedicated antennas, and may instead simply comprise connecting means (e.g., coaxial connectors for wiring) to existing and/or external antennas in the vehicle.

The VAD controller unit 330 may comprise suitable circuitry for performing (remaining) operations and/or functions of the VAD 300. The VAD controller unit 330 may comprise, for example, one or more main processors 350, a system memory 352, a communication subsystem 354, an input/output (I/O) subsystem 356, and a logging management component 358.

Each main processor 350 may comprise suitable circuitry operable to process data, and/or control and/or manage operations of the VAD 300, and/or tasks and/or applications performed therein. In this regard, the main processor 350 may configure and/or control operations of various components and/or subsystems of the VAD 300, by utilizing, for example, one or more control signals. The main processor 350 may comprise a general purpose processor (e.g., CPU), a special purpose processor (e.g., application-specific integrated circuit (ASIC)), or the like. The disclosure, however, is not limited to any particular type of processors. The main processor 350 may enable running and/or execution of applications, programs and/or code, which may be stored, for example, in the system memory 352. Alternatively, one or more dedicated application processors may be utilized for running and/or executing applications (or programs) in the VAD 300.

The system memory 352 may comprise suitable circuitry for permanent and/or non-permanent storage, buffering, and/or fetching of data, code and/or other information, which may be used, consumed and/or processed. In this regard, the system memory 352 may comprise different memory technologies, including, for example, read-only memory (ROM), random access memory (RAM), Flash memory, solid-state drive (SSD), and/or field-programmable gate array (FPGA). The disclosure, however, is not limited to any particular type of memory or storage devices. The system memory 352 may store, for example, configuration data, which may comprise parameters and/or code, comprising software and/or firmware, logging data, etc.

The communication subsystem 354 may comprise suitable circuitry operable to communicate signals from and/or to the electronic device, such as via one or more wired and/or wireless connections. In this regard, the communication subsystem 354 may be configured to support one or more wired or wireless interfaces, protocols, and/or standards, and to facilitate transmission and/or reception of signals to and/or from the VAD 300, and/or processing of transmitted and/or received signals, in accordance with the applicable interfaces, protocols, and/or standards. Examples of signal processing operations that may be performed by the communication subsystem 354 comprise, for example, filtering, amplification, analog-to-digital conversion and/or digital-to-analog conversion, up-conversion/down-conversion of baseband signals, encoding/decoding, encryption/decryption, and/or modulation/demodulation. For example, the communication subsystem 354 may be configured to support broadcast of alert related signals, via the antenna(s) 340.

The I/O subsystem 356 may comprise suitable circuitry for managing user interactions with the VAD 300, such as to enable obtaining input from and/or providing output to device user(s). The I/O subsystem 356 may support various types of inputs and/or outputs, including, for example, video, audio, tactile, and/or textual. In this regard, dedicated I/O devices and/or components, external to (and coupled with) or integrated within the VAD 300, may be utilized for inputting and/or outputting data during operations of the I/O subsystem 356. Examples of such dedicated I/O devices may comprise user interface components or devices (e.g., the display 312), audio I/O components (e.g., speakers and/or microphones), mice, keyboards, touch screens (or touchpads), and the like. In some instances, user input obtained via the I/O subsystem 356, may be used to configure and/or modify various functions of particular components or subsystems of the VAD 300.

The logging management component 358 may comprise suitable circuitry for managing logging operations in the VAD 300. The logging operations may comprise compiling log files (stored in the system memory 352) containing data relating to alerts, as described above.

Also, while not shown in FIG. 3, the VAD controller unit 330 may also comprise component for managing power supply (e.g., to the VAD controller unit 330 itself, and/or to other units, such as the VAD operator unit 310).

As noted above, as shown in the example implementation illustrated in FIG. 3, the VAD 300 may be implemented as multi-unit system, comprising multiple separate components (the VAD operator unit 310, the VAD antenna unit 320, and the VAD controller 330). In this regard, as noted each of the different physical unit may be configured for placement at particular location and/or position, selected for optimal performance with respect to functions and/or operations provided by that unit. For example, the VAD operator unit 310 may be configured for placement within the operator compartment (e.g., train cockpit) at position optimal for providing output to and/or receiving input from the operator (e.g., top of the dashboard). The VAD antenna unit 320, may be configured for placement outside (and on top) of the engine car. The VAD controller unit 330 may be configured for placement within the engine car, but out of the way (for convenience).

As the VAD controller unit 330 may house the bulk of the VAD resources (e.g., processing resources, storage resources, etc.), the VAD controller 330 may be configured to support connect to and/or communicate with the remaining unit(s) and/or available resources that may be utilized in support of operations of the VAD 300. For example, the VAD controller unit 330 may comprise data port 340, for enabling connecting to the VAD 300 for extracting data therefrom (e.g., log files) and/or inputting data thereto (e.g., for (re)configuration); a power connector 342 (e.g., drawing power from sources within the train); a VAD operator unit (VOU) connector 344; configured for connecting to the VAD operator unit 320 (e.g., to provide power thereto, exchange data therewith, etc.); one or more antenna connectors 346 (e.g., for connecting to the VAD antenna unit 320, existing antennas in the train, etc.); one or more GNSS connectors 348, for connecting to existing GNSS systems (or transceivers); etc.

Figure 4:
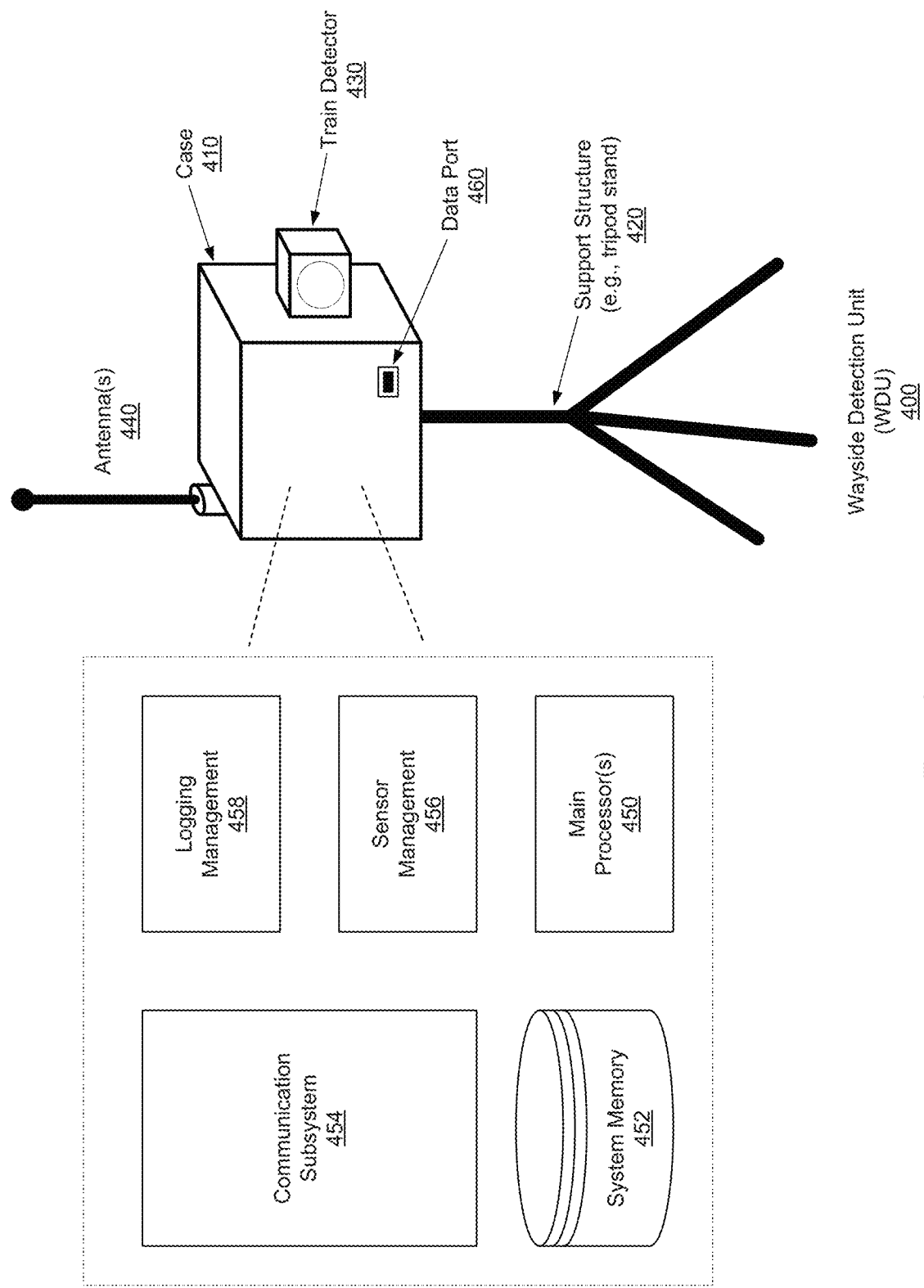
FIG. 4 illustrates an example wayside detection unit (WDU), in accordance with the present disclosure.

FIG. 4 illustrates an example wayside detection unit (WDU), in accordance with the present disclosure. Shown in FIG. 4 is a wayside detection unit (WDU) 400.

The WDU 400 may comprise suitable one or more of hardware (including circuitry and/or other hardware components), software, and combination thereof for implementing various aspects of the present disclosure, particularly with respect to the wayside detection and/or alert related functions in support of worker protection solutions. The WDU 400 may be a particular example implementation of the WDU 130, as described with respect to FIGS. 1A and 1B. In this regard, as noted above WDUs may be configured as portable (moveable) devices that are placed along the expected path (e.g., train tracks) of vehicles that may pose safety threats to workers at particular locations. The WDU 400 is operable to perform such functions, in support of work protection systems in accordance with the present disclosure, as detecting approaching vehicles, triggering alerts at wearable devices (e.g., by broadcasting signals configured for interfacing with the wearable devices (e.g., PADs 100) to trigger the alerts thereby), and triggering critical alarms when a train enters a work area, as well as additional alert related functions, such logging alert related data, etc.

In the example implementation illustrated in FIG. 4, the WDU 400 may comprise a housing 410 for enclosing various components of the WDU 400 and/or allowing attachment to certain external elements or structures. The housing 410 may be constructed to be suitable for the intended operation environment and/or conditions of the WDU 400 (e.g., being constructed to be very rigid, to withstand accidental impacts during deployment and/or when it knocked down), and to withstand environmental conditions associated with outside/external use (e.g., rain, extreme cold/heat), etc.). The WDU 400 has one or more antennas 440, used in transmitting and/or receiving signals (e.g., broadcast alert related signals). Further, the WDU 400 may have sensory elements, such as a train detector 430. In this regard, the train detector 430 may be operable to monitor, detect, and track approaching vehicle, using one or more suitable technologies (e.g., visual, infrared, laser ranging, etc.), and/or to enable generating corresponding data (distance, relative speed, etc.). The WDU 400 typically would also comprise (or can be coupled to) a support structure 420, such as a rigid tripod, to enable placement of the WDU 400, such as near train tracks.

Internally, the WDU 400 may comprise suitable circuitry for performing various operations in support of its functions. For example, the WDU 400 may comprise one or more main processors 450, a system memory 452, a communication subsystem 454, a sensor management component 456, and a logging management component 458.

Each main processor 450 may comprise suitable circuitry operable to process data, and/or control and/or manage operations of the WDU 400, and/or tasks and/or applications performed therein. In this regard, the main processor 450 may configure and/or control operations of various components and/or subsystems of the WDU 400, by utilizing, for example, one or more control signals. The main processor 450 may comprise a general purpose processor (e.g., CPU), a special purpose processor (e.g., application-specific integrated circuit (ASIC)), or the like. The disclosure, however, is not limited to any particular type of processors. The main processor 450 may enable running and/or execution of applications, programs and/or code, which may be stored, for example, in the system memory 452. Alternatively, one or more dedicated application processors may be utilized for running and/or executing applications (or programs) in the WDU 400.

The system memory 452 may comprise suitable circuitry for permanent and/or non-permanent storage, buffering, and/or fetching of data, code and/or other information, which may be used, consumed and/or processed. In this regard, the system memory 452 may comprise different memory technologies, including, for example, read-only memory (ROM), random access memory (RAM), Flash memory, solid-state drive (SSD), and/or field-programmable gate array (FPGA). The disclosure, however, is not limited to any particular type of memory or storage devices. The system memory 452 may store, for example, configuration data, which may comprise parameters and/or code, comprising software and/or firmware, logging data, etc.

The communication subsystem 454 may comprise suitable circuitry operable to communicate signals from and/or to the electronic device, such as via one or more wired and/or wireless connections. In this regard, the communication subsystem 454 may be configured to support one or more wired or wireless interfaces, protocols, and/or standards, and to facilitate transmission and/or reception of signals to and/or from the WDU 400, and/or processing of transmitted and/or received signals, in accordance with the applicable interfaces, protocols, and/or standards. Examples of signal processing operations that may be performed by the communication subsystem 454 comprise, for example, filtering, amplification, analog-to-digital conversion and/or digital-to-analog conversion, up-conversion/down-conversion of baseband signals, encoding/decoding, encryption/decryption, and/or modulation/demodulation. For example, the communication subsystem 454 may be configured to support broadcast of alert related signals, via the antenna(s) 440.

The sensor management component 456 may comprise suitable circuitry for managing sensors, such as the train detector 430. For example, the sensor management component 456 may control the selection of detection and ranging technology implemented by the train detector 430, set the parameters required for its operations, and/or process information obtained via the train detector 430, to generate corresponding data (e.g., distance to approaching train, relative speed, etc.).

The logging management component 458 may comprise suitable circuitry for managing logging operations in the WDU 400. The logging operations may comprise compiling log files (stored in the system memory 452) containing data relating to alerts, as described above.

The WDU 400 may comprise a data port 460 for extracting data (e.g., log files) from and/or inputting data (e.g., (re)configuration data) into the WDU 400.

FIG. 5 illustrates an example safety vest, in accordance with the present disclosure. Shown in FIG. 5 is a worker safety vest 500.

The safety vest 500 may be configured for use in (and/or in conjunction with) worker protection systems, such as radio (RF) based worker protection systems. For example, the safety vest 500 may be used in conjunction with the worker protection system 100 described in FIG. 1. In this regard, the safety vest 500 may be used in lieu of the portable alert devices (PADs) 110. As such, the safety vest 500 may be configured to perform functions, and/or may be incorporate (where possible) components or features, described above with respect to the portable alert devices (PADs). The disclosure is not limited to the worker protection systems described above, however, and as such the safety vest 500 may be used in any suitable worker protection system that may support operations and use of the safety vest 500 as described.

Such worker protection systems (including, e.g., the system(s) described with respect to FIGS. 1-4) typically comprise transmitter—receiver pair(s), with the transmitter(s) affixed to the vehicle posing threat to the works (e.g., construction vehicles or trains) and/or near the worksite (e.g., on or near train tracks—that is, wayside), and the workers wearing receiver(s) on their body to allow notification of the warning, such as in response to receiving signals from the transmitters. In such systems, under particular conditions (e.g., when receiving signals from the transmitter(s)), warnings to the users may be triggered, such as in the form of one or more of audio warning (e.g., chirps), vibration, visual warning (e.g., using a constant or flashing light), etc.

In some instances, requiring workers to wear receiving devices may pose some challenges and/or have some disadvantages, however. For example, in some working conditions, the receiving devices may be placed in an area which is not optimum for receiving the warnings such as a pocket. Also, receiving devices may be dropped or lost without warning (and without the workers realizing that). Further, in some instances, the receiving devices may interfere with work being performed.

Accordingly, the present disclosure provides solutions that ensure performing the "receiver" functions needed in worker protection systems, while addressing possible challenges and/or disadvantage that may arise with use of dedicated and separate receiver devices. Further, this may done in manner that ensure proper reception of the signal from the transmitter(s), such as by ensuring that components required for receiving the signals be within a "line of sight" to the transmitter(s), without any part of the worker's body interfering with this sight line. For example, may be done by incorporating components pertinent to the receiver related functions into items or equipment workers typically use in work areas, such as safety vests.

In various example implementations, functions and/or components supporting such functions relating to the worker receiver component of the worker protection device are integrated seamlessly into safety vests, which worker are already wear in work sites. The safety vest 500 illustrated in FIG. 5 represents such example implementation.

As shown in FIG. 5, the safety vest 500 incorporates various modules that are required for performing the worker protection receiver functions, such as radio receiver (or transceiver) 510, antenna system 520, acknowledge component 530, and a power source (e.g., rechargeable or disposable battery pack) 540.

While not shown in FIG. 5, the safety vest 500 also comprise one or more suitable components for providing warnings (or safety indication messages/signals) to the worker. For example, the safety vest 500 may incorporate a visual indicator (e.g., LED), an audio indicator (e.g., speaker), a vibration element, etc., which may be integrated into the safety vest 500, and may be configured to provide suitable indications (e.g., visual, audible, vibration, etc.) in response to triggering of alerts.

The radio receiver 510 may comprise suitable circuitry for handling reception (and, optionally, transmission) of signals, including performing necessary signal processing operations. The radio receiver 510 (or another separate component—not shown in FIG. 5) may also comprise suitable circuitry for providing other functions, such as storing data (including code), running and/or executing various applications and/or functions (e.g., alert related), power management, logging, handling input/output functions (e.g., supporting different forms of alert indications, including visual, audio, and/or tactile, and handling user input, such as acknowledges of alerts), and the like.

The acknowledge component 530 may be configured to receive and recognize indications of user acknowledgment in response to warning indications (e.g., by pressing the acknowledge component 530), when alert indication(s) are outputted.

The various components may be arranged and/or distributed through the vest to maintain overall balance, and ensure that the added weight is not noticed by the worker.

The antenna system 520 may be arranged to ensure optimal performance. In this regard, as the worker moves around, parts of the worker's body may become out of the signal line of sight. Thus, to ensure that signals are continually received, the antenna structures may be arranged on various parts of the vest, such as on the front, side and rear of the vest. This ensures that at least a part of the antenna system 520 is always in signal line of sight, no matter where the corresponding transmitter(s) may be located in relation to the worker. This structure/design of the antenna system 520 may also allow for other features. For example, this structure may also accommodate a "diversified" antenna configuration/operation, such that alternate antennas are activated periodically to ensure that the strongest signal would be received.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A worker protection system comprising:
   a safety vest configured for use by a worker, the safety vest comprising:
     a power supply for powering components of the safety vest;
     one or more antennas configured for at least receiving wireless signals;
     one or more circuits configured for processing signals and data, and for performing one or more functions relating to operation of the safety vest;
   wherein:
     the one or more antennas receive wireless signals from one or more transmitting devices; and
     the one or more circuits:
       process the received signals;
       generate based on the received signals, a safety alert; and
       provide one or more alert indications to the worker based on the safety alert.

2. The worker protection system of claim 1, wherein the one or more circuits determine based on the processing of the received signals when alert conditions exist; and generate the safety alert based on determining that the alert condition exist.

3. The worker protection system of claim 1, wherein the one or more antennas are arranged to ensure reception of signals from any direction.

4. The worker protection system of claim 3, wherein the one or more antennas are arranged on front, sides, and back of the safety vest.

5. The worker protection system of claim 1, wherein the one or more antennas are configured for use of diversity during the reception and/or transmission of wireless signals.

6. The worker protection system of claim 1, wherein the one or more circuits log data relating to alerts triggered and/or handled by the safety vest.

7. The worker protection system of claim 1, wherein the power supply comprises a rechargeable power supply.

8. The worker protection system of claim 7, wherein the rechargeable power supply is operable to recharge without direct connection.

9. The worker protection system of claim 1, wherein the safety vest comprises one or more acknowledgment components, configured for receiving input from the worker, to indicate acknowledgment of the safety alert.

10. The worker protection system of claim 1, wherein the safety vest output comprises one or more indicator components.

11. The worker protection system of claim 10, wherein one or more circuits output the one or more alert indications via the one or more indicator components.

12. The worker protection system of claim 10, wherein one or more circuits configure the one or more alert indications for outputting via the one or more indicator components.

13. The worker protection system of claim 10, wherein the one or more indicator components comprise at least one of visual indicator, audio indicator, and a tactile indicator.

14. A safety vest for use in worker protection systems, the safety vest comprising:
a power supply for powering components of the safety vest;
one or more antennas configured for at least receiving wireless signals;
one or more circuits configured for processing received signals and generating safety alerts based on the processing of the received signals; and
one or more indicator components configured for one or more alert indications to the worker based on the safety alerts.

15. The safety vest of claim 14, wherein the one or more antennas are arranged to ensure reception of signals from any direction.

16. The safety vest of claim 14, wherein the one or more antennas are arranged on front, sides, and back of the safety vest.

17. The safety vest of claim 14, wherein the one or more antennas are configured for use of diversity during the reception and/or transmission of wireless signals.

18. The safety vest of claim 14, wherein the power supply comprises a rechargeable power supply.

19. The safety vest of claim 18, wherein the rechargeable power supply is operable to recharge without direct connection.

20. The safety vest of claim 14, wherein the safety vest comprises one or more acknowledgment components, configured for receiving input from the worker, to indicate acknowledgment of the safety alert.

* * * * *